(12) United States Patent
Kiel et al.

(10) Patent No.: US 8,561,375 B2
(45) Date of Patent: Oct. 22, 2013

(54) LINE SYNCHRONIZATION

(75) Inventors: Tobias Kiel, Verden (DE); Dieter Meier, Kirchlinteln-Holtum Geest (DE); Christian Carstens, Stemmen (DE); Uwe Aldag, Scheeßel (DE)

(73) Assignee: VEMAG Mashinenbau GmbH, Verden/Aller (DE)

(*) Notice: Subject to any disclaimer, the term of this patent is extended or adjusted under 35 U.S.C. 154(b) by 202 days.

(21) Appl. No.: 12/858,861

(22) Filed: Aug. 18, 2010

(65) Prior Publication Data

US 2011/0045148 A1 Feb. 24, 2011

(30) Foreign Application Priority Data

Aug. 20, 2009 (DE) .................. 10 2009 038 208

(51) Int. Cl.
*B65B 57/10* (2006.01)

(52) U.S. Cl.
USPC ........ 53/55; 53/435; 53/503; 53/513; 53/514; 53/237; 53/52

(58) Field of Classification Search
USPC ....... 53/503, 428, 435, 111 R, 513, 514–519, 53/235, 237, 247, 249, 250, 52, 55, 493, 53/501
See application file for complete search history.

(56) References Cited

U.S. PATENT DOCUMENTS

| | | | |
|---|---|---|---|
| 3,164,857 A | 1/1965 | Sennello | |
| 4,116,600 A * | 9/1978 | Dutton et al. | 425/296 |
| 4,570,419 A * | 2/1986 | Tinsley | 53/473 |
| 4,707,790 A * | 11/1987 | Gomes et al. | 700/222 |
| 5,548,947 A * | 8/1996 | Fincham et al. | 53/551 |
| 6,035,604 A * | 3/2000 | Gustafsson | 53/64 |
| 6,047,526 A * | 4/2000 | Draghetti | 53/443 |
| 6,460,312 B1 * | 10/2002 | Nakagawa et al. | 53/55 |
| 2007/0082593 A1 | 4/2007 | Baechtle et al. | |
| 2007/0180795 A1 * | 8/2007 | Topfer | 53/459 |

FOREIGN PATENT DOCUMENTS

DE 10335680 B3 12/2004
WO 98/32660 A1 7/1998

OTHER PUBLICATIONS

German Patent Office, Search Report in Application No. DE 102009038208.9, Jun. 11, 2010.

* cited by examiner

*Primary Examiner* — Christopher Harmon
(74) *Attorney, Agent, or Firm* — Wood, Herron & Evans, L.L.P.

(57) ABSTRACT

A system for producing and transporting portions of food includes a filling machine for continuously transporting a stream of food, a separating device for dividing portions from the transported food stream, and a transport device for delivering the portions to a subsequent processing device. To prevent fluctuations in portion size and weight, the system further includes a sensor unit for generating a portion request signal in response to a portion request from the subsequent processing device. The sensor unit outputs the portion request signal to the filling machine, which is designed to control the continuous transportation of the food stream using the portion request signal. The system is operable to synchronize the entire line, including the filling machine, the separating device, the transport device, and the subsequent processing device.

12 Claims, 5 Drawing Sheets

LINE SYNCHRONIZATION

TECHNICAL FIELD

The present invention relates to a system and a method for producing and transporting food portions, and more specifically, to a system including a filling machine for continuous transportation of a stream of food.

BACKGROUND

Food portions are frequently produced as follows: A food supply is stored in a filling machine, and is dispensed from the filling machine to a cut-off device. The cut-off device divides the stream of food delivered by the filling machine into individual portions and delivers these portions to a conveyor belt or other transport apparatus. The conveyor belt transports the food portion to a subsequent processing device, which packages or reshapes the food portion or carries out other work steps thereon.

Various designs, interactions, and methods of operation of the individual components are known. The filling machine, for example, can operate in a start-and-stop mode, i.e., the filling machine starts to deliver the stream of food in response to a portion request signal and stops delivery of the stream of food in response to the end of the portion request signal. In another example, such a filling machine may issue a cutting signal to the cut-off device, whereupon the cut-off device separates the stream of food at the end of the portion. Such a method of operation is referred to as a discontinuous system because the filling machine starts and stops its operation according to the portion request signal.

Another system is also known in which the filling machine delivers the stream of food continuously, without changing a filling speed. An external portion request signal is received by the cut-off device, which divides the stream of food into individual portions in response to the portion request signal. To this end, the portion request signal also functions as the cutting signal.

Still another known system includes a higher-level controller that controls the food delivery sequence. In this system, the higher-level controller issues a filling speed signal to the continuously operating filling machine and a cutting signal to the cut-off device. The higher-level controller thus determines the operation of both the cut-off device and the filling machine simultaneously.

Figure 5:
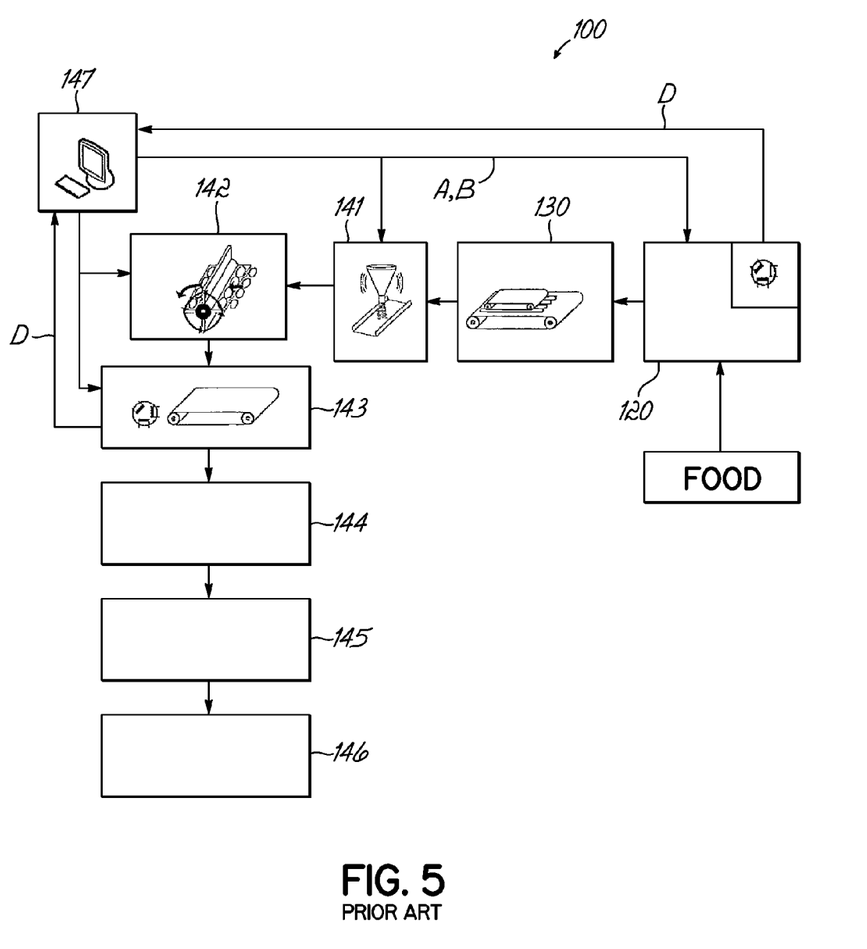
FIG. 5 is a schematic view of a conventional system for producing and transporting food portions.

An exemplary 100 system having a higher-level controller 147 is depicted in FIG. 5. The path of the food portions in the system 100 is as follows: a dough or a mass of meat is fed to a dough divider or knife 120 and is divided into individual portions by the knife 120. The shaping belt 130 receives the divided dough portions from the knife 120, shapes the portions, and delivers the portions to a chute or flouring device 141. From the flouring device 141, the shaped portions are then delivered to a rotary gate 142, which delivers the shaped portions to a proofing conveyor (also referred to as proofer) 143. The dough shapes are transported from the proofer 143 to a baking sheet 144 and deposited on the baking sheet 144. The dough shapes are then delivered from the baking sheet 144 to a proofing cabinet 145 and then to an oven 146.

The signal control by the higher-level controller 147 of the system 100 of FIG. 5 is as follows: measurement data "D" from the knife 120 and the proofer 143 are input into the controller 147. On the basis of these entered data D, the controller 147 calculates signals which are then issued to the knife 120 and the proofer 143, as well as to the rotary gate 142 and to the flouring device 141

In the exemplary embodiment of the system 100 shown in FIG. 5, the dough is fed continuously. Thus, the portion request signal issued by the controller 147 corresponds to the cutting signal. In this regard, the portion size is determined by the cut-off timing, which is actuated by the controller 147 to the knife 120. The portion request signal is referred to as "A" and the cutting signal is referred to as "B." As shown in FIG. 5, the portion request signal A is equivalent to the cutting signal B.

The known devices have various disadvantages. When portioning some products (dough, for example), greater weight fluctuations in the portions result when the filling machine is accelerated and slowed for each portion compared to when the portioning is done (for example by cutting) during continuous operation of the filling machine. However, if continuously operating machines in a line define the moment when portions are produced in order for the line to work optimally, that operation results in a contradiction of competing interests. On the one hand, the filling machine must transport at the most constant possible speed for exact portioning of a certain number of portions, yet on the other hand, subsequent components on the line specify whether 99 or 101 portions per minute are needed at that moment as the certain number of portions.

As explained above, other systems are known in which the filling machine is started by an individual signal for each portion, whereupon the filling machine transports the set portion size and then stops again. The separating of the portions takes place at the end of each portion. Such a system has the disadvantage that the starting and stopping operation may result in poor weight precision for the portions.

Also mentioned above are other systems that transport food at a velocity wherein continuous transporting is possible without readjusting the velocity. The separating of the portions in such systems takes place at the cut-off device, controlled by time to cut periodically or by a signal. Such systems have the disadvantage that the portioning yield of the line may drop during operation, for example, from 101 to 99 portions per minute because of fluctuations in the power grid. As a result, the portions are either too heavy or the production is interrupted by a malfunction.

The object of the invention is to address these and other disadvantages of the systems and methods known in the existing art for producing and transporting food portions.

SUMMARY OF THE INVENTION

According to the invention, a system for producing and transporting food portions is proposed. The system includes the following: a filling machine for continuously transporting of a stream of food, a separating device for separating food portions from the transported stream of food, a transporting device for transporting the portions to a subsequent processing device, and a sensor unit for generating a portion request signal on the basis of a portion request from the subsequent processing device. The sensor unit issues the portion request signal to the filling machine, which controls the continuous transporting of the food stream according to the portion request signal. Line synchronization is achieved by the system A signal which originates at the subsequent processing machine reports to the filling machine when portions are to be produced. This signal is a portion request signal for the continuously operating filling machine. The disadvantages of discontinuous operation of the filling machine, including rapid wear and high waste of food, are avoided by using the continuously operating filling machine. Fluctuations in the power grid leading to fluctuations of portions per minute can also be evened out because the machines run synchronously. More specifically, the filling machine is synchronized with the subsequent processing device.

Preferably, the filling machine is also designed to generate a separating signal in response to receiving the portion request signal. The filling machine issues the separating signal to the separating device, which then separates the portions in response to the separating signal. Such a system offers the advantage that the line synchronization of the filling machine and the subsequent processing device also extends to the separating device. Because the separating device is operating synchronously with the filling machine, the size and weight of the portions are as constant as possible and fluctuations in portion size and weight are reduced or prevented.

Preferably, at least one of the portion request signal or the separating signal is a timing signal. A timing signal as used in this description is a signal which includes a frequency that determines the working cycle of the filling machine or the separating device. The timing signal is a square-wave signal, alternating between a logical "1" value and a logical "0" value. As used in this description, the "timing signal" can also be a triangular signal, saw tooth signal, or any other signal that is suitable for determining the working cycle of at least one of the filling machine and the separating device.

Preferably, one cycle of the timing signal represents at least one of the request of one portion or the separation of one portion. Alternatively, one cycle of the timing signal represents at least one of the request or the separation of two portions. In another example, two cycles of the timing signal represent at least one of the request or the separation of one portion. In this regard, any combination of the ratio of number of a cycles of the timing signal to requests and/or separations of a number of portions is possible within the scope of the invention. The possibility of setting the ratio of portions to signals has the advantage that imprecisions in the signal sequence (i.e., jitters) can be compensated for, by setting, for example, three portions per three signals instead of one portion per one signal.

Preferably the filling machine has a control unit to control both the continuous transportation of the food stream according to the portion request signal, and the generation of the separating signal in response to the portion request signal. Such a control unit in the filling machine offers the advantage that no higher-level controller is necessary. To this end, the system for producing and transporting food portions can be simplified such that the disadvantages of the higher-level controller are avoided. The system is inherently synchronous, without having to rely on an external control unit. Therefore, the system provides simple and reliable line synchronization according to the invention.

Preferably the control unit of the filling machine is designed to synchronize the separating signal with the portion request signal. This operation offers the advantage that the separating device is constantly synchronized with the filling machine.

Preferably the control unit is designed to calculate a mean value for the cycle lengths of the portion request signal. The control unit is also designed to control the continuous transportation of the food stream by the filling machine according to the mean value. The control unit is also configured to generate the separating signal using the mean value. The signals or cycle lengths are preferably processed algorithmically (e.g., by taking the mean value), and are used as the basis for the speed of the filling machine and for the timing the separating signal. In that way, high precision is attained by transporting the food at nearly constant speed, and adaptation to slight fluctuations in the positioning performance of the line is also made possible. Although the filling machine transports continuously, the situation is prevented in which a different number of portions is produced than was requested by the downstream system.

Preferably the control unit is designed to stop the operation of the filling machine and the separating device if no clock cycle is received for a certain time. Consequently, a production backup or empty line can be prevented.

Preferably the system also includes a filling stream divider. The filling stream divider is operable to divide the food stream or the food portions (i.e., before or after the separating device) into a plurality of parallel food streams or food portions transported synchronously on the transport device.

Preferably the subsequent processing device is designed to shape and package the portions. Other subsequent processing device designs are also possible within the scope of the invention, such as a chute or flouring device, a shaping belt, a rotary gate, a proofing conveyor, a baking sheet, a proofing cabinet, or an oven.

Preferably the filling machine is a vacuum based filling machine. Preferably the separating device includes a knife or scraper. Other designs of the separating device are also possible within the scope of the invention.

In another aspect, the invention relates to a filling machine for continuous transportation of a stream of food and for use in the system described above. The filling machine is designed to control the continuous transportation of the stream of food according to a portion request signal.

In still another aspect, the invention relates to a method for producing and transporting food portions. The method includes these steps: transporting of a stream of food continuously, separating portions from the transported stream of food, transporting the portions to a subsequent processing device, generating a portion request signal on the basis of a portion request from the subsequent processing device, and controlling the continuous transporting of the stream of food using the portion request signal.

Preferably the method further includes generating a separating signal using the portion request signal, and separating the portions using the separating signal. Preferably the method also includes synchronizing the separating signal with the portion request signal.

Preferably the method further includes calculating a mean value from the cycle lengths of the portion requesting signal, controlling the continuous transporting of the food stream according to the mean value, and generating the separating signal using the mean value.

Preferably the method also includes stopping the continuous transporting and separating if no clock cycle of the portion request signal is received for a certain time. Preferably the method further includes shaping and packaging the portions in the subsequent processing device.

BRIEF DESCRIPTION OF THE DRAWINGS

The system will be explained below on the basis of exemplary embodiments illustrated in the following figures.

DETAILED DESCRIPTION

Figure 1:
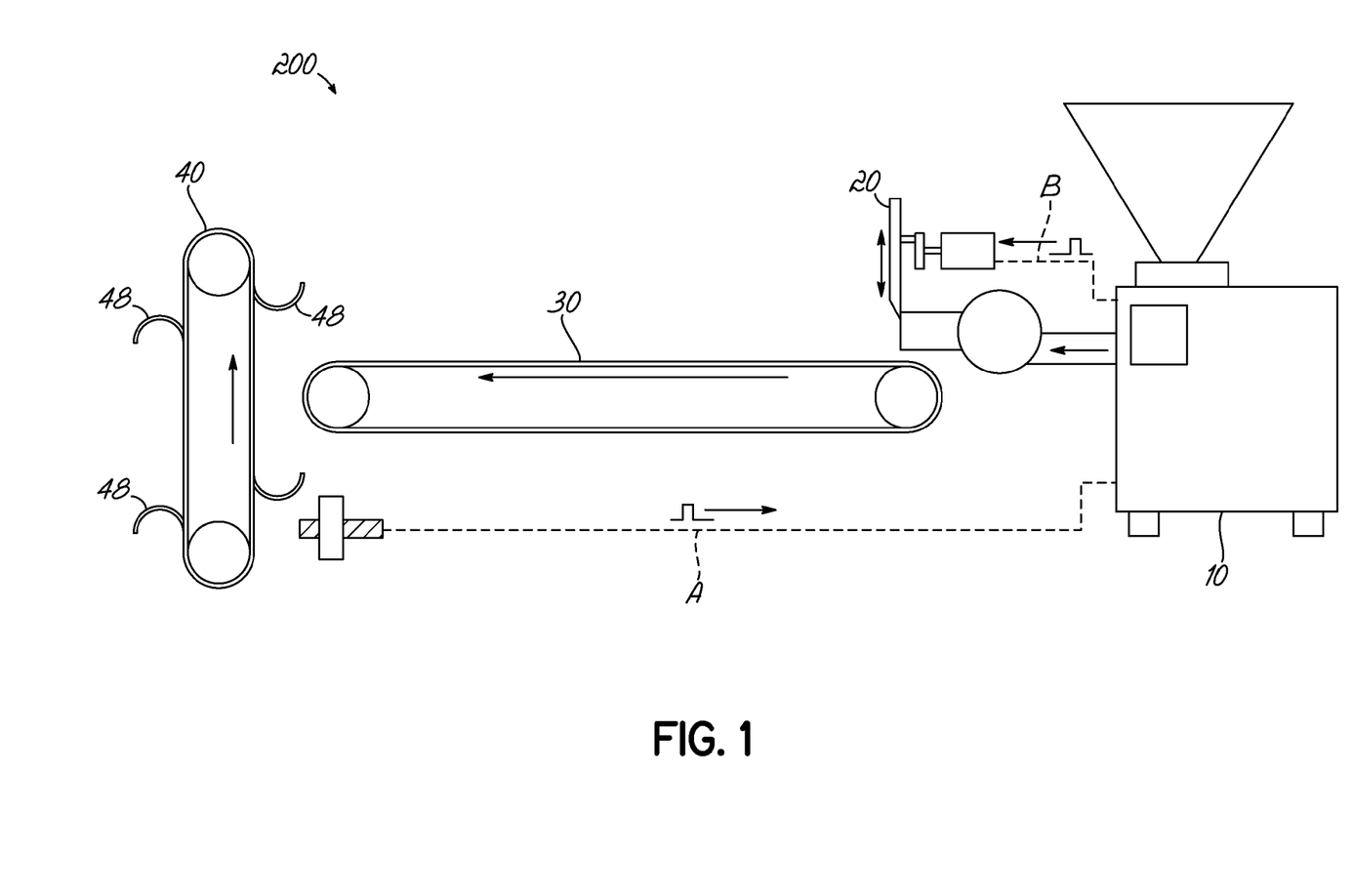
FIG. 1 is a schematic view of the system according to one embodiment of the invention.

FIG. 1 illustrates schematically a system 200 according to one embodiment of the invention for producing and transporting food portions. The system 200 includes a filling machine 10 for continuously transporting a food stream. The system 200 also includes a separating device 20, which is designed to separate portions from the transported food stream. The system 200 further includes a transporting device 30 for transporting the portions to a subsequent processing device 40. The transporting device 30 is preferably a conveyor belt. The system 200 also includes a sensor unit 50 designed to generate a portion request signal A on the basis of a portion request produced by the subsequent processing device 40. The sensor unit 50 issues the portion request signal A to the filling machine 10. The subsequent processing device 40 may include a device for packaging the individual portions.

To ensure that every one of the packages 48, indicated schematically in FIG. 1 by semicircles on subsequent processing device 40, is filled, the subsequent processing device 40 serves as a so-called "master" to generate the portion request signal A. During operation, an empty package 48 carried by the subsequent processing device 40 and the portion being transported by the conveyor belt 30 to the location to fill the package 48 are synchronized by the sensor unit 50. To this end, the sensor unit 50 measures the position of the empty package 48 and generates the portion request signal A on the basis of the measurement to synchronize the delivery of a portion into the empty package 48.

Based on the generated portion request signal A from the sensor unit 50, which may be located at the end of the transport device 30 or at the subsequent processing device 40, the line is synchronized with the filling machine 10 or the separating device 20. It is preferred that the sensor unit 50 generates the portion request signal A in response to the transfer of a portion from the transport device 30 to the subsequent processing device 40.

The sensor unit 50 can be designed to determine the weight and the size of the portion that is being transported by the transport device 30, and to synchronize the line with the filling machine 10 or the separating device 20 accordingly. The filling machine 10 controls the continuous transporting of the food stream on the basis of the generated portion request signal A, thereby achieving the line synchronization according to the invention.

Preferably, the filling machine 10 generates a cutting or separating signal B, which is issued to the separating device 20, in response to the portion request signal A. Because the separating signal B is generated in the filling machine 10 on the basis of the portion request signal A, the operation of the filling machine 10 and the separating device 20 are synchronized with each other, enabling fluctuations in portion size or weight to be evened out.

Figure 2:
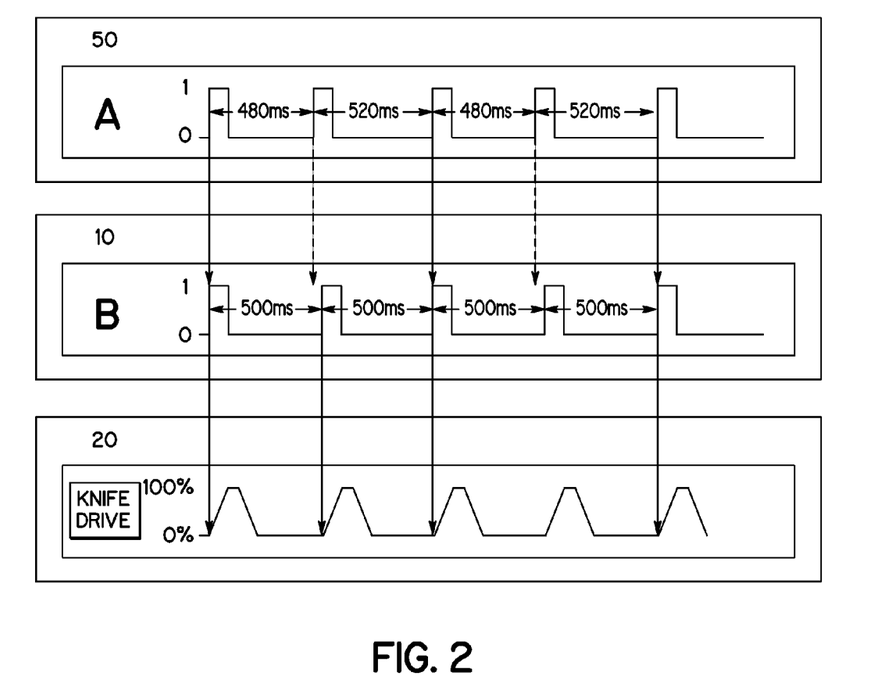
FIG. 2 is a view of a signal scheme used with the system of FIG. 1.
Figure 3:
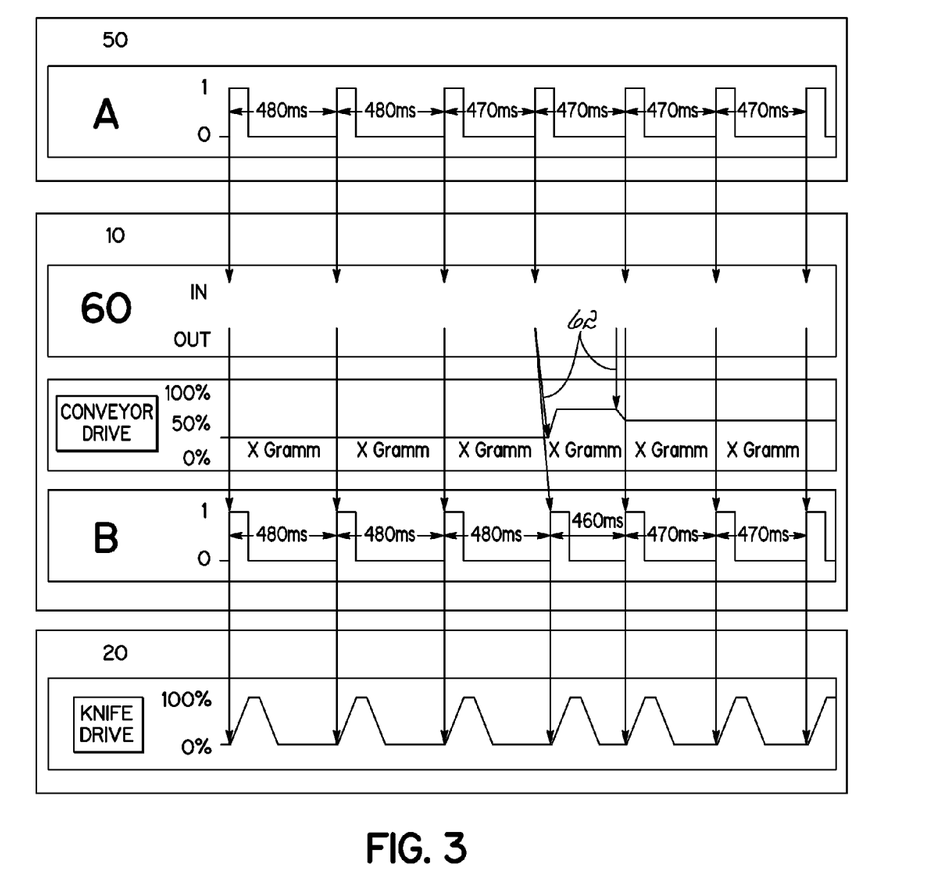
FIG. 3 is a view of a signal scheme used with the control unit of the filling machine of the system of FIG. 1.

FIG. 2 illustrates an overview of the signals of the sensor unit 50, the filling machine 10, and the separating device 20. The signals of the sensor unit 50 and the filling machine 10 are illustrated as square-wave timing signals. Timing signals of any other shape are equally possible within the scope of the invention, however. The square-wave signal is shown in FIGS. 2 and 3 to explain the frequency of the working cycle of the filling machine 10 and of the separating device 20. As illustrated in FIG. 2, the maximum value of the timing or square-wave signal is designated with a logical 1 and the minimum value with a logical 0.

The sensor unit 50 generates the portion request signal A, which serves as the master signal for the portioning cycle. According to the invention, the master signal is then passed to the line by the sensor unit 50 or the subsequent processing device 40. As shown in FIG. 2, the clock cycle or cycle length of the portion request signal A may vary. Such a fluctuation or change in the clock cycle of the portion request A signal may be caused unintentionally, for example by power fluctuations in the power grid, or intentionally, for example by portion size or weight rearrangement.

The filling machine 10 receives the portion request signal A from the sensor unit 50 and in response, generates the cutting signal B. FIG. 2 illustrates how the filling machine 10 or a control unit 60 of the filling machine 10 evens out the fluctuation in the portion request signal A. To this end, a mean value is calculated from the fluctuating or changing cycle lengths of 480 ms and 520 ms of the portion request signal A, and this calculated signal cycle mean value controls the issuance of cutting signal B to the cut-off device 20.

The signal of the cut-off device 20 in FIG. 2 represents the operation of the knife drive, which is variable between 0% and 100% in order to divide the food stream into individual portions. The knife drive is controlled by the clock cycle or the cycle length of the cutting signal B. More specifically, at each actuation of the cutting cycle signal B, the knife drive is operated from 0% to 100% in order to effect a separation of a portion from the food stream. Synchronization of the portion request signal A, the cutting signal B, and the knife drive is thus achieved, and synchronization of the line caused by synchronization of the signals substantially prevents fluctuation in portion size or weight.

FIG. 3 shows another signal scheme, in which the control operation within the filling machine 10 is depicted in greater detail. The sensor unit 50 specifies the master signal for the portioning cycle in the form of portion request signal A. The portion request signal A preferably alternates between a logical value of 0 (inactive) and a logical value of 1 (active). FIG. 3 depicts a situation where the clock cycle of the portion request signal A is shortened from 480 ms to 470 ms such that a change occurs in the tempo of the portion request signal A.

The filling machine 10 or the control unit 60 of the filling machine 10 receives the portion request signal A as an input IN. The control unit 60 initially detects a cycle length of 480 ms, until the tempo change to 470 ms occurs. Upon detecting the tempo change, control unit 60 undergoes a change processing, in order to synchronize the filling machine 10 and the cut-off device 20 with the tempo-modified portion request signal A. To that end, the control module 60 issues modified signals at an output OUT, which adjust the velocity of the conveyor drive (mean signal pattern of the schematic filling machine 10 of FIG. 3) and the timing of the cutting signal B to correspond to the tempo-modified portion request signal A.

The conveyor drive velocity is variable between 0% and 100%. In the illustrated example of FIG. 3, a portion is to have a weight of X grams. The conveyor drive is actuated so that X grams of the food stream are delivered from the filling machine 10 within the cycle length of the portion request signal A, in order to be separated by the cut-off device 20 into a portion weighing X grams. If the time interval of the portion request signal is lowered, as shown in the example in FIG. 3, the conveyor drive receives the signal from the control unit 60 to increase velocity accordingly, so as to continue transporting the predefined weight of X grams in the shorter time of 470 ms. The control unit 60 controls the conveyor drive so that a transition cycle (highlighted by arrows 62) is used after the tempo change from 480 to 470 ms to undergo a change processing and adjust the transport performance of filling machine 10 to the new tempo.

While undergoing the change processing, the output (the conveyor tempo) is higher for one portion length than for the new portioning cycle, so that the portion delivered during the change processing has the same weight as all other portions. After the change processing, the portion request signal A and the cutting signal B are again synchronized with each other. In the illustrated example, each signal corresponds to one portion. Alternatively, a different relationship of signal to portion may be chosen, so that for example (at a setting of "212") every second portion request is ignored and the corresponding cutting signal is calculated as the mean between the signals. The signals may also be dependent not only on the number of portions, but on the "tolerance," as well as other known parameters and algorithms.

As previously explained in reference to FIG. 2, the cutting signal B is synchronized with the portion request signal A by being generated in response to portion request signal A. Consequently, fluctuations or changes in the portion request signal A are converted directly to a modified clock signal or cycle length of cutting signal B. In the example of FIG. 3, this conversion is accomplished by a short transition cycle of 460 ms, which synchronizes the cutting signal B with the portion request signal A as quickly as possible.

The cut-off device 20 divides portions from the food stream in response to the cutting signal B such that the knife drive is modifiable between 0% and 100%. As depicted in FIG. 3, the knife drive is actuated from 0% to 100% in response to the actuation of the cutting signal B.

Figure 4:
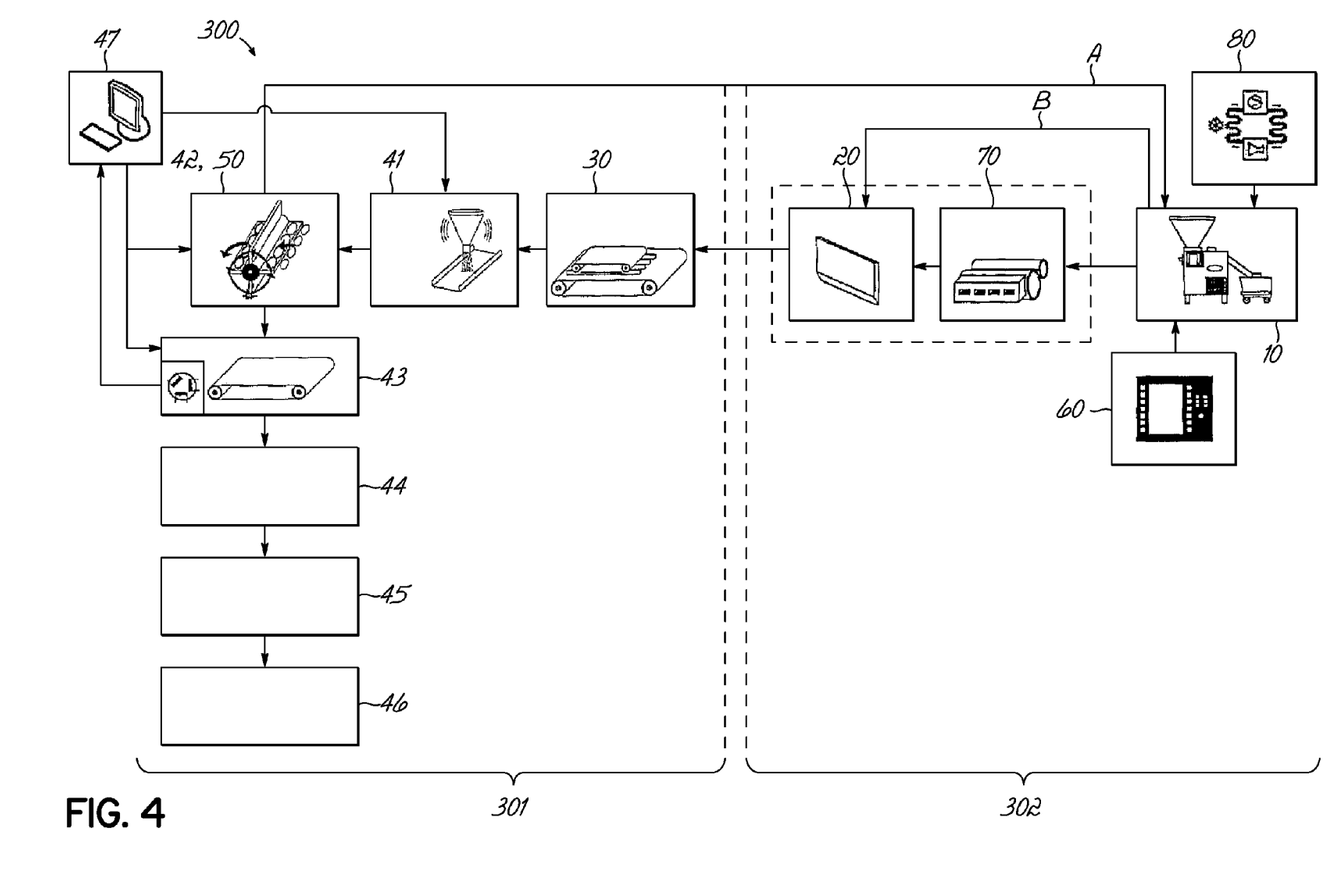
FIG. 4 is a schematic view of another embodiment of the system according to the invention.

FIG. 4 illustrates another embodiment of the system 300 according to the invention. In this embodiment the production line of FIG. 4 is divided into a master portion 301 and a slave portion 302. The master portion 301 corresponds essentially to a conventional system, such as the system 100 described above in reference to FIG. 5. The slave portion 302 includes the filling machine 10. According to this embodiment, the filling machine 10 is operated in combination with the master portion 301 as described in further detail below.

The filling machine 10 includes a control unit 60. The control unit 60 is preferably a graphics PC. The filling machine 10 preferably also includes a cooling system 80, which keeps the food stream, or the food mass from which the food stream is formed, at an appropriate temperature. The food stream is output from the filling machine 10 to a filling stream divider (also known as a "water wheel") 70, which divides the food stream into a plurality of food streams. The food streams 70 are then output to the cut-off device 20. The cut-off device 20 divides the food streams into portions and delivers these portions to the transport device or shaping belt 30. The shaping belt 30 delivers the food streams to the chute or flouring device 41, and from there to the rotary gate 42. The rotary gate 42 transfers the portions to a proofing conveyor 43, after which the portions are placed on a baking sheet 44 and are forwarded to a proofing cabinet 45 and an oven 46.

The master portion 301 may optionally include a higher-level controller 47, as explained earlier in reference to FIG. 5. The filling machine 10 is operated as described below. The rotary gate 42 operates as a subsequent processing device 40. The rotary gate 42 includes recesses into which the portions are received. The rotary gate 42 could operate in the same way for example for shaping or packaging the portions. The rotary gate 42 includes the sensor unit 50, which picks up the clock signal, for example, at the shaft of the rotary gate 42 in order to generate the portion request signal A. The portion request signal A is output by the rotary gate 42 or the sensor unit 50 and is delivered to the filling machine 10. The control unit 60 of the filling machine 10 generates the separating signal B in response to the portion request signal A, and then outputs it to the cut-off device 20. In this manner, line synchronization of the filling machine 10 and the cut-off device 20 with the subsequent processing device 40 is achieved.

In order to correct recurring deviations of the master signal (i.e., the portion request signal A), the system 300 can be instructed to respond only to every second or third signal cycle, by entering a so-called "2/2" or "3/3" mode. The skipped cycles are replaced by calculated (jitter-free) signals. The algorithm preferably uses two different methods for the synchronization: a first method defining very slight speed change and a second method with a temporary rapid jump to a substantially higher or lower speed. By preference, the first method is used. But if the mismatch between the external signal cycle (portion request signal A) and the cutting signal (B) is greater than a set "tolerance," the second method is used. When inputting a value for the "tolerance," the tolerance is limited depending on the current portion size/duration.

A "timeout" option of the control unit 60 preferably specifies how many external signal cycles of portion request signal A may be lacking before the filling machine 10 is stopped.

Preferably, at the start-up of the line, the control unit 60 or the filling machine 10 analyzes the external signal cycle of signal A for a predetermined length of time before operation of the system 300 or the filling machine 10 begins. During this analysis, the tempo of the filling machine 10 and the portions per signal are determined.

The invention claimed is:

1. A line system for producing and transporting portions of food, the system comprising:
   a filling machine configured to continuously transport a stream of food;
   a separating device configured to divide the portions of food from the stream of food;
   a subsequent processing device configured to request one of the portions of food;
   a transport device configured to transport the portions of food from the separating device to the subsequent processing device;
   a sensor unit operable to generate a portion request signal in response to a portion request from the subsequent processing device wherein the sensor unit outputs the portion request signal to the filling machine such that the filling machine controls the continuous transportation of the stream of food according to the portion request signal, thereby synchronizing the line system; and
   a control unit configured to control the continuous transportation of the food stream according to the portion request signal, and the control unit being operable to generate a separating signal for the separating device in response to the portion request signal,
   wherein the control unit of the filling machine is configured to calculate a mean value from cycle lengths of the portion request, and wherein the control unit of the filling machine controls the continuous transportation of the food stream based on the calculated mean value and also generates the separating signal based on the calculated mean value.

2. The line system of claim 1, wherein the filling machine is operable to generate a separating signal in response to receiving the portion request signal, and the filling machine outputs the separating signal to the separating device such that the separating device controls dividing the portions of food according to the separating signal.

3. The line system of claim 2, wherein at least one of the portion request signal or the separating signal is a clock signal.

4. The line system of claim 3, wherein the clock signal defines at least one cycle, and each cycle represents the requesting or separating of one portion of food.

5. The line system of claim 3, wherein the clock signal defines at least one cycle, and each cycle represents the requesting or separating of two portions of food.

6. The line system of claim 3, wherein the clock signal defines at least a pair of cycles, and each pair of cycles represents the requesting or separating of one portion of food.

7. The line system of claim 1, wherein the control unit of the filling machine synchronizes the separating signal with the portion request signal.

8. The line system of claim 1, wherein the control unit of the filling machine is configured to stop the operation of at least one of the filling machine or the separating device if no portion request signal is received by the filling machine over a predetermined time period.

9. The line system of claim 1, further comprising:
   a filling stream divider configured to separate the stream of food in the filling machine into a plurality of streams of food.

10. The line system of claim 1, wherein the subsequent processing device is configured to shape or package the portions of food.

11. The line system of claim 1, wherein the filling machine is a vacuum-based filling machine.

12. The line system of claim 1, wherein the separating device further includes at least one of a knife or a scraper.

\* \* \* \* \*

UNITED STATES PATENT AND TRADEMARK OFFICE
CERTIFICATE OF CORRECTION

PATENT NO. : 8,561,375 B2
APPLICATION NO. : 12/858861
DATED : October 22, 2013
INVENTOR(S) : Tobias Kiel et al.

Page 1 of 1

It is certified that error appears in the above-identified patent and that said Letters Patent is hereby corrected as shown below:

Title Page

Item (73), change "Mashinenbau" to --Maschinenbau--.

Signed and Sealed this
Eleventh Day of February, 2014

Michelle K. Lee
*Deputy Director of the United States Patent and Trademark Office*